(12) United States Patent
Sitaraman et al.

(10) Patent No.: US 10,728,143 B2
(45) Date of Patent: *Jul. 28, 2020

(54) APPARATUS, SYSTEM, AND METHOD FOR SHARING LABELS ACROSS LABEL-SWITCHED PATHS WITHIN NETWORKS

(71) Applicant: Juniper Networks, Inc., Sunnyvale, CA (US)

(72) Inventors: Harish Sitaraman, Cupertino, CA (US); Raveendra Torvi, Nashua, NH (US); Markus Jork, Andover, MA (US); Kireeti Kompella, Los Altos, CA (US); Vishnu Pavan Beeram, Naperville, IL (US); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,427

(22) Filed: Jun. 7, 2019

(65) Prior Publication Data

US 2019/0297008 A1     Sep. 26, 2019

Related U.S. Application Data

(63) Continuation of application No. 15/493,103, filed on Apr. 20, 2017, now Pat. No. 10,361,949.

(30) Foreign Application Priority Data

Mar. 8, 2017 (IN) .............................. 201711008087

(51) Int. Cl.
*H04L 12/723*    (2013.01)
*H04L 12/28*    (2006.01)
*H04L 12/701*    (2013.01)
*H04L 12/781*    (2013.01)

(52) U.S. Cl.
CPC .............. *H04L 45/50* (2013.01); *H04L 45/52* (2013.01)

(58) Field of Classification Search
CPC .................. H04L 45/50; H04L 45/507; H04Q 2011/0077
USPC ....................................... 370/400
See application file for complete search history.

(56) References Cited

U.S. PATENT DOCUMENTS

| 2002/0112072 A1* | 8/2002 | Jain ......................... H04L 45/00 709/239 |
| 2008/0186951 A1* | 8/2008 | Hirota ..................... H04L 45/00 370/351 |
| 2014/0177638 A1* | 6/2014 | Bragg ..................... H04L 45/50 370/395.5 |

\* cited by examiner

*Primary Examiner* — Khaled M Kassim
*Assistant Examiner* — Jason A Harley
(74) *Attorney, Agent, or Firm* — FisherBroyles, LLP

(57) ABSTRACT

The disclosed computer-implemented method may include (1) receiving, at a network node within a network, a packet from another network node within the network, (2) identifying, within the packet, a label stack that includes a plurality of labels that collectively represent at least a portion of an LSP within the network, (3) popping, from the label stack, a label that corresponds to a specific link to a further network node, and then upon popping the label from the label stack, (4) forwarding the packet to the further network node by way of the specific link. Various other methods, systems, and apparatuses are also disclosed.

17 Claims, 8 Drawing Sheets

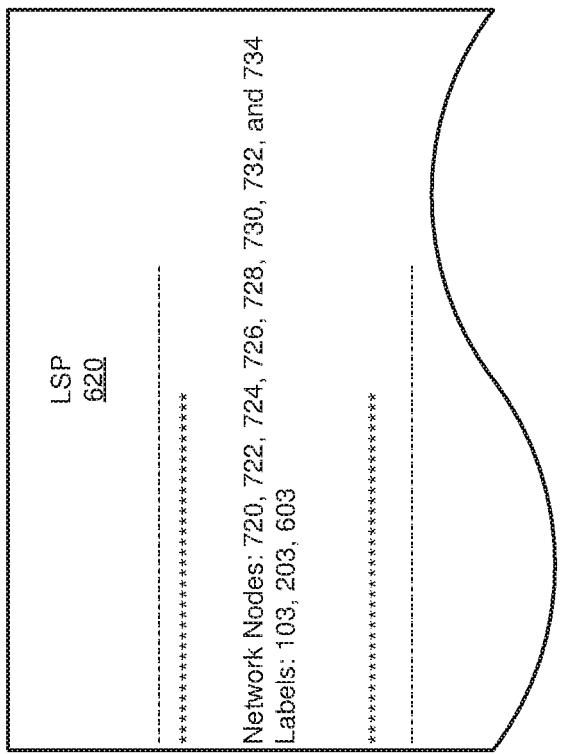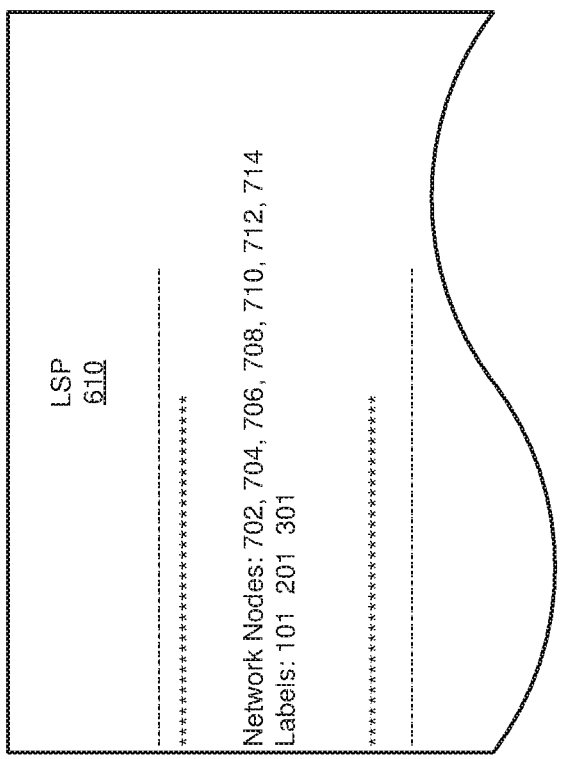
FIG. 6

APPARATUS, SYSTEM, AND METHOD FOR SHARING LABELS ACROSS LABEL-SWITCHED PATHS WITHIN NETWORKS

CROSS REFERENCE TO RELATED APPLICATION

This application is a continuation of U.S. application Ser. No. 15/493,103 filed 20 Apr. 2017, the disclosure of which is incorporated, in its entirety, by this reference.

BACKGROUND

MultiProtocol Label Switching (MPLS) networks often include various paths that facilitate the flow of traffic from a source device to a destination device. In such MPLS networks, these paths may be identified and/or represented by a sequence of labels that correspond to different portions of the paths. For example, a packet may traverse an MPLS network from a source device to a destination device. Along the way, the packet may arrive at an intermediary node that switches the packet's existing label for another label that corresponds to a subsequent hop within the LSP and then forwards the packet. Since labels are switched in this way as packets traverse MPLS networks, these paths are often referred to as Label-Switched Paths (LSPs).

LSPs may include and/or represent various nodes within a network. Each of these nodes may maintain and/or program both control plane and data plane state or data for the relevant LSPs. For example, a certain network node may represent a portion of 100,000 LSPs. In other words, 100,000 LSPs may include and/or pass through that network node.

In many traditional configurations, the number of data plane states maintained by a network node may be directly proportional to the number of LSPs that include that network node. In other words, such traditional configurations may require the data plane state to remain directly proportional to the control plane state. For example, in the event that a network node represents a portion of 100,000 LSPs, that network node may need to manage 100,000 different labels in the data plane by creating, updating, and/or deleting such labels when changes occur. As a result, the network node may be adding and/or deleting labels to the data plane on a nearly constant basis. Unfortunately, managing so many labels in this way may consume a substantial amount of computing resources. Moreover, since the control plane must wait for the data plane to be ready before initiating signaling from one node to another, managing so many labels in this way may delay the MPLS network's control plane signaling, thereby potentially impeding the MPLS network's performance.

The instant disclosure, therefore, identifies and addresses a need for apparatuses, systems, and methods for sharing labels across LSPs within networks.

SUMMARY

As will be described in greater detail below, the instant disclosure generally relates to apparatuses, systems, and methods for sharing labels across LSPs within networks. In one example, a computer-implemented method for sharing labels across LSPs within networks may include (1) receiving, at a network node within a network, a packet from another network node within the network, (2) identifying, within the packet, a label stack that includes a plurality of labels that collectively represent at least a portion of an LSP within the network, (3) popping, from the label stack, a label that corresponds to a specific link to a further network node, and then upon popping the label from the label stack, (4) forwarding the packet to the further network node by way of the specific link.

As another example, a system for implementing the above-described method may include various modules stored in memory. The system may also include at least one physical processor that executes these modules. For example, the system may include (1) a receiving module that receives a packet from another network node within the network, (2) an identification module that identifies, within the packet, a label stack that includes a plurality of labels that collectively represent at least a portion of an LSP within the network, (3) a label module that pops, from the label stack, a label that corresponds to a specific link to a further network node, and (4) a forwarding module that forwards the packet to the further network node by way of the specific link.

As a further example, an apparatus for implementing the above-described method may include (1) at least one storage device that stores a plurality of labels that correspond to portions of LSPs within a network and (2) at least one physical processing device communicatively coupled to the storage device within a network node, wherein the physical processing device (A) receives a packet from another network node within the network, (B) identifies, within the packet, a label stack that includes a plurality of labels that collectively represent at least a portion of an LSP within the network, (C) pops, from the label stack, a label that corresponds to a specific link to a further network node and then upon popping the label from the label stack, (D) forwards the packet to the further network node by way of the specific link.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of additional information that identifies additional LSPs.

Figure 1:
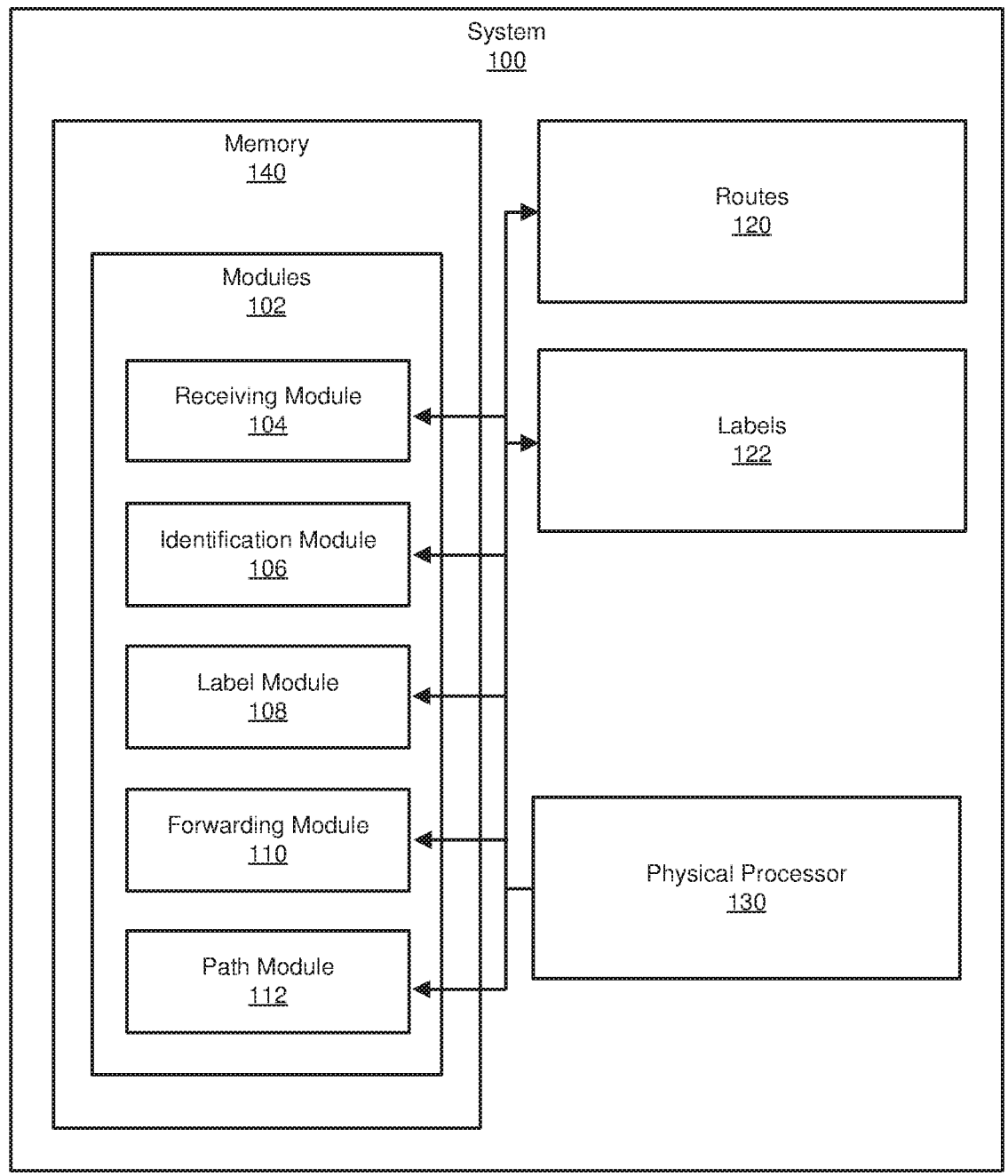
FIG. 1 is a block diagram of an exemplary system for sharing labels across LSPs within networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for sharing labels across LSPs within networks. As will be explained in greater detail below, network nodes may be able to share labels across LSPs such that the number of labels needed to support the MPLS LSPs is reduced significantly. Rather than maintaining the same number of labels as the number of LSPs in the data plane, each network node may only need to maintain the same number of labels as the number of different next hops included in the LSPs.

As a specific example, a router may represent a portion of 100,000 LSPs within an MPLS network. In this example, the router may interface with 10 other nodes that represent portions of those 100,000 LSPs within the MPLS network. Rather than maintaining 100,000 labels in the forwarding table of the data plane, the router may only need to maintain 10 different labels that correspond to the other nodes, thereby drastically reducing resource consumption and/or processing demands. As a result, the router may be able to manage the labels in the forwarding table of the data plane without needing to perform updates so frequently. In doing so, the router's data plane may be ready for control plane signaling much more often when compared to traditional label-management configurations.

Because the data plane is ready more often, the router may be able to reduce and/or mitigate delays in control plane programming, thereby improving the network's performance. Moreover, because these labels are installed ahead of the setup and/or establishment of the LSPs, these labels may be available in the forwarding table of the data plane prior to the setup and/or establishment of the LSPs.

The following will provide, with reference to FIGS. 1-2, 5, and 7, detailed descriptions of exemplary systems for sharing labels across LSPs within networks. Detailed descriptions of information that identifies different LSPs will be provided in connection with FIGS. 4 and 6. Detailed descriptions of corresponding computer-implemented methods will be provided in connection with FIG. 3. In addition, detailed descriptions of an exemplary computing system for carrying out these methods will be provided in connection with FIG. 8.

FIG. 1 is a block diagram of an exemplary system 100 for sharing labels across LSPs within networks. As illustrated in this figure, exemplary system 100 may include one or more modules 102 for performing one or more tasks. As will be explained in greater detail below, modules 102 may include a receiving module 104, an identification module 106, a label module 108, a forwarding module 110, and a path module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network nodes 202 and/or 206), the devices illustrated in FIG. 5 (e.g., network nodes 202, 206, 502, 504, 506, 508, 510, 512, and/or 514), and/or the devices illustrated in FIG. 7 (e.g., network nodes 702, 704, 706, 708, 710, 712, 714, 720, 722, 724, 726, 728, 730, and/or 732). In addition, one or more of modules 102 may perform any of the functionality described herein in connection with any of the devices illustrated in FIG. 2, the devices illustrated in FIG. 5, and the devices illustrated in FIG. 7. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate sharing labels across LSPs within networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more routes, such as routes 120. In some examples, routes 120 may each identify at least a portion of a particular path (e.g., an LSP) within a network. In such examples, routes 120 may facilitate the flow of traffic within the network. Examples of routes 120 include, without limitation, Address Resolution Protocol (ARP) routes, prefixes, Internet Protocol (IP) routes, IP addresses, Media Access Control (MAC) addresses, variations or combinations of one or more of the same, and/or any other suitable routes.

Exemplary system 100 may further include one or more labels, such as labels 122. In some examples, labels 122 may include and/or represent MPLS labels. In such examples, labels 122 may be assigned and/or attached to traffic and/or individual packets. Labels 122 may indicate and/or correspond to at least a portion of a particular path within a network. Accordingly, routing and/or forwarding decisions may be determined and/or controlled by the particular labels assigned to a packet. For example, a router may receive a packet, identify one of the labels assigned to the packet, and then forward the packet to the next hop corresponding to that particular label.

Figure 2:
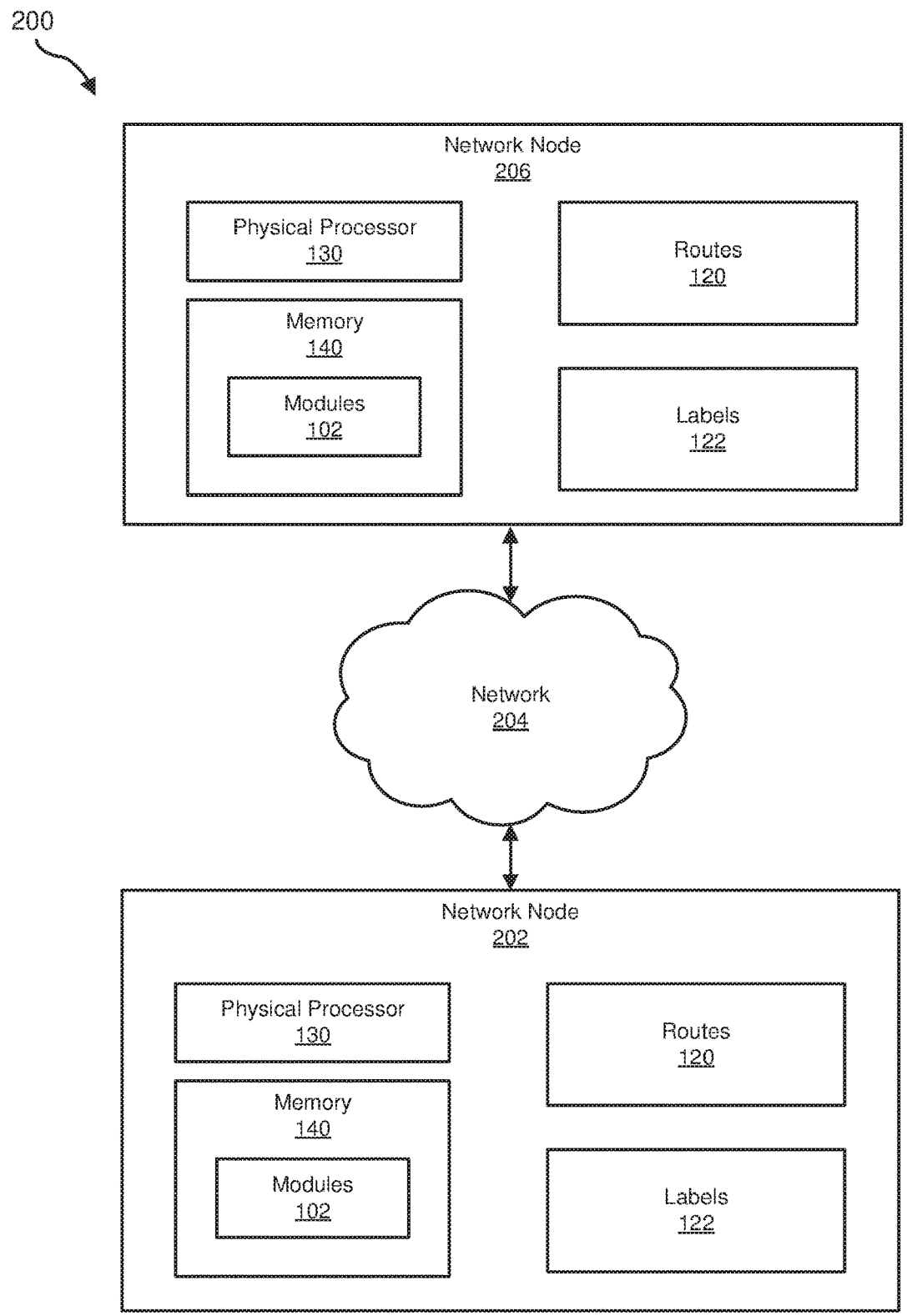
FIG. 2 is a block diagram of an additional exemplary system for sharing labels across LSPs within networks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network node 202 in communication with a network node 206 via a network 204. In one example, all or a portion of the functionality of modules 102 may be performed by network node 202, network node 206, and/or any other suitable computing system. As will be described in greater detail below, one or more of modules 102 from FIG. 1 may, when executed by at least one processor of network node 202 or 206, enable network node 202 or 206 to share labels across LSPs within networks.

Network nodes 202 and 206 each generally represent any type or form of physical computing device that facilitates communication within a network and/or across networks. In one example, network nodes 202 and 206 may each include and/or represent a router (such as a customer edge router, a provider edge router, a hub router, a spoke router, an autonomous system boundary router, and/or an area border router). Additional examples of network nodes 202 and 206 include, without limitation, switches, hubs, modems, bridges, repeaters, gateways, multiplexers, network adapters, network interfaces, servers, portions of one or more of the same, combinations or variations of one or more of the same, and/or any other suitable network nodes.

Network 204 generally represents any medium or architecture capable of facilitating communication or data transfer. In one example, network 204 may facilitate communication between network nodes 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource ReSerVation Protocol (RSVP)-Traffic Engineering (TE) network, portions of one or more of the same, variations or combinations of one or more of the same, and/or any other suitable network. Although illustrated as being external to network 204 in FIG. 2, network nodes 202 and 206 may each represent a portion of network 204 and/or be included in network 204.

Figure 3:
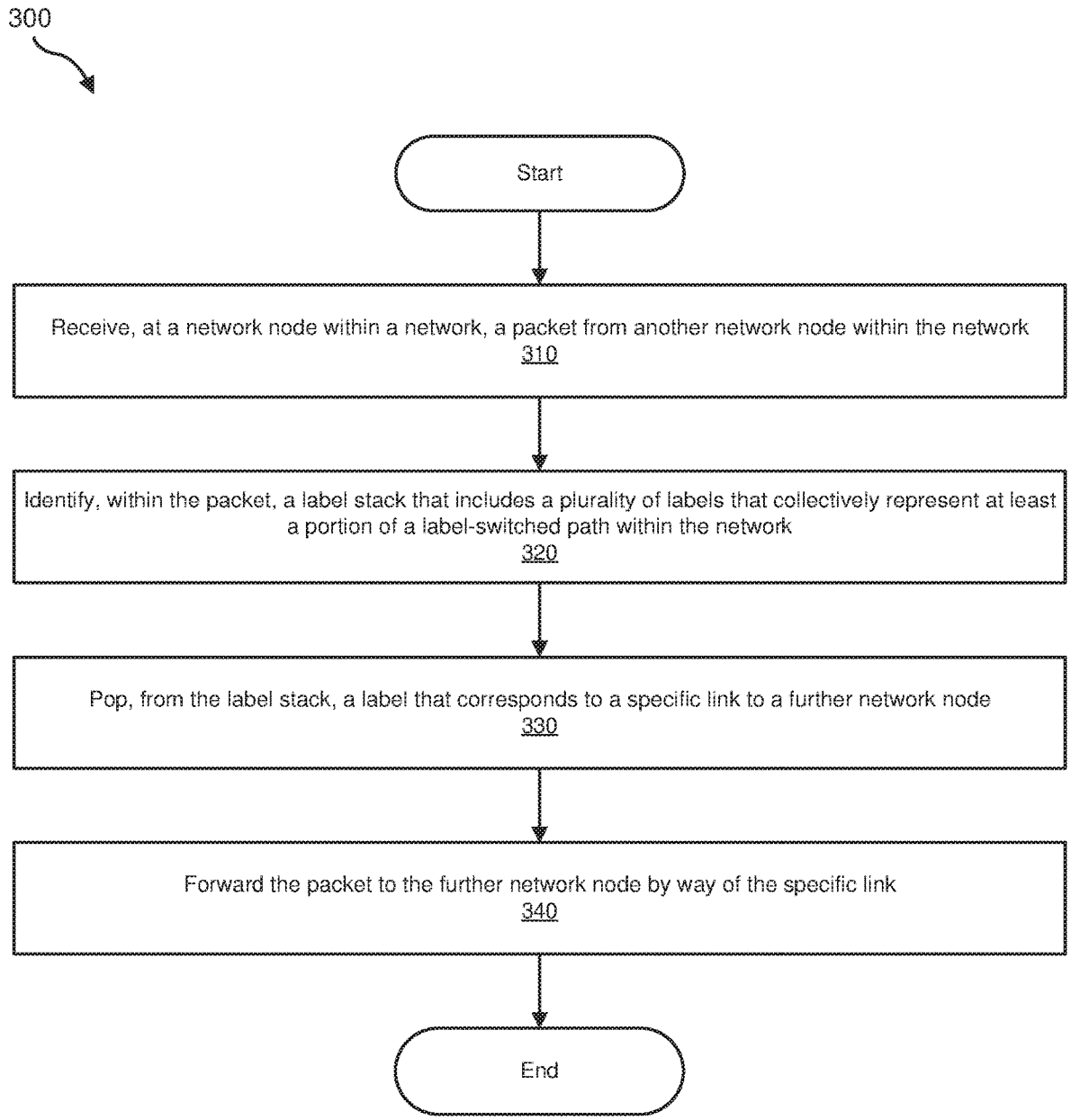
FIG. 3 is a flow diagram of an exemplary method for sharing labels across LSPs within networks.

FIG. 3 is a flow diagram of an example computer-implemented method 300 for sharing labels across LSPs within networks. The steps shown in FIG. 3 may be performed by any suitable computer-executable code and/or computing system, including system 100 in FIG. 1, system 200 in FIG. 2, system 500 in FIG. 5, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the apparatuses and/or systems described herein may receive, at a network node within a network, a packet from another network node within the network. For example, receiving module 104 may, as part of network node 202 in FIG. 2 or 5, receive a packet from network node 206 in FIG. 2 or FIG. 5 via network 204. The term "packet," as used herein, generally refers to any type or form of communication package, encapsulation, abstraction, and/or object that includes one or more formatted units of data.

The systems described herein may perform step 310 in a variety of different ways and/or contexts. In some examples, receiving module 104 may monitor traffic arriving at network node 202. While monitoring such traffic, receiving module 104 detect and/or receive an incoming packet from network node 206. In one example, the packet may have originated from network node 206. Alternatively, the packet may have originated at another device and then passed through network node 206 on the way to network node 202.

In one example, the packet may be destined for the Internet, which may be reached via network node 202. In another example, the packet may be destined for a home network and/or client device, which may be reached via network node 202.

Returning to FIG. 3, at step 320 one or more of the apparatuses and/or systems described herein may identify, within the packet, a label stack that includes a plurality of labels that collectively represent at least a portion of an LSP within the network. For example, identification module 106 may, as part of network node 202 in FIG. 2 or 5, identify a label stack within the packet. In this example, the label stack may include multiple labels that collectively represent at least a portion of an LSP within network 204. The term "label stack," as used herein, generally refers to any collection of labels that each identify a certain segment or link of an LSP.

The systems described herein may perform step 320 in a variety of different ways and/or contexts. In some examples, identification module 106 may search at least a portion of the packet for the label stack. For example, identification module 106 may locate the header of the packet and then begin searching the header for a label stack. In this example, while searching the header, identification module 106 may identify a label stack that includes multiple labels. Each label in the label stack may identify and/or represent a different link of the LSP being traversed by the packet.

In some examples, one or more of the systems described herein may establish and/or support the establishment of the LSP to enable the packet to traverse the LSP. For example, label module 108 may, as part of network node 202 in FIG. 2 or 5, assign a label to a specific link that leads to another network node. By doing so, label module 108 may enable any packet whose label stack includes that assigned label to be forwarded to that other network node by way of the specific link. In other words, any packet that arrives at network node 202 and includes the assigned label as the next one to be popped (e.g., the top label in the label stack) may be forwarded to the other network node by way of the specific link. Label module 108 may store the label in connection with the specific link in the routing table of the control plane. Additionally or alternatively, label module 108 may store the label in connection with the specific link in the forwarding table of the data plane.

Figure 5:
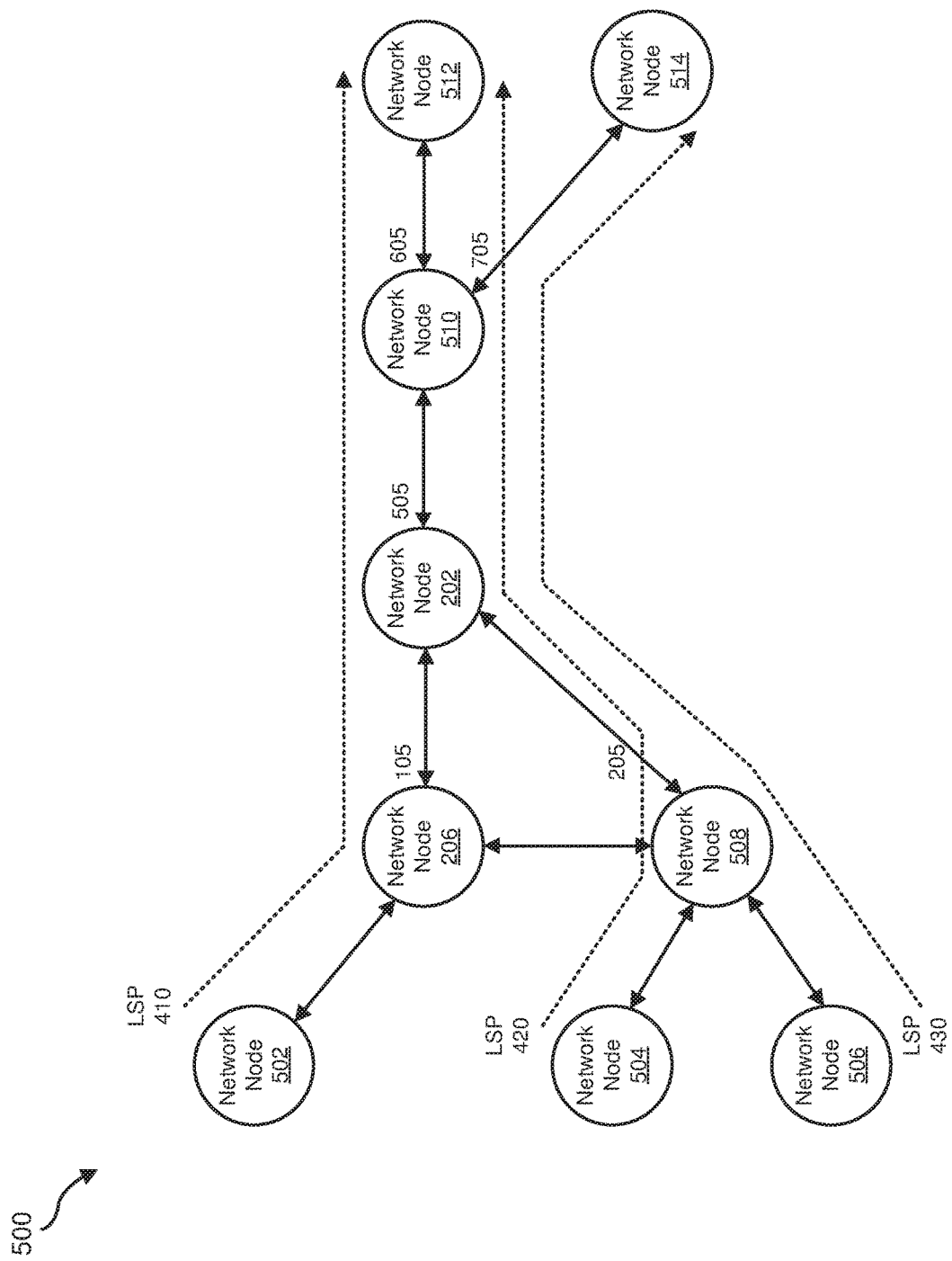
FIG. 5 is a block diagram of an additional exemplary system for sharing labels across LSPs within networks.

Continuing with this example, receiving module 104 may, as part of network node 202 in FIG. 2 or 5, receive a reservation message that is to include labels assigned to links that lead to network nodes included in the LSP. In this example, the reservation message may include and/or represent an RSVP-TE message that originated from an egress node of the LSP and is destined for the ingress node of the LSP. The term "egress node," as used herein, generally refers to any physical computing device that represents the final hop and/or final destination node of the LSP. The term "ingress node," as used herein, generally refers to any physical computing device that represents the node at which the LSP begins and/or originates.

As the reservation message arrives at network node 202, label module 108 may add the label assigned to the specific link to the reservation message. Once the label is added to the reservation message, forwarding module 110 may, as part of network node 202 in FIG. 2 or 5, forward the reservation message toward the ingress node that created and/or manages the LSP.

As a specific example in connection with FIG. 5, network node 502 in FIG. 5 may create and/or establish an LSP that includes network nodes 502, 206, 202, 510, and 512. To do so, network node 502 may create an RSVP-TE path message and then forward the same to network node 206 in FIG. 5 on the way to network node 512 in FIG. 5. In this example, the path message may eventually store the path state of each node included in the LSP. Upon receiving the path message, network node 206 may add its IP address to the path message and then forward the same to network node 202 in FIG. 5.

Continuing with this example, network node 202 may add its IP address to the path message and then forward the same to network node 510 in FIG. 5. Upon receiving the path message, network node 510 may add its IP address to the path message and then forward the same to network node 512 in FIG. 5. To enable network node 502 to finish creating and/or establishing the LSP, network node 512 may create an RSVP-TE reservation message and then forward the same to network node 510 on the way back to network node 502. In one example, this reservation message may include one or more IP addresses of the network nodes in the LSP.

In this example, network node 510 may assign label 605 to the link that leads to network node 512. Upon receiving the reservation message, network node 510 may add label 605 to the reservation message. In some examples, network node 510 may also add its IP address to the reservation message. For example, network node 510 may add label 605 to the label object in the reservation message. In this example, network node 510 may also add label 605 to the label sub-object in the record-route object of the reservation message. Additionally or alternatively, the label sub-object in the record-route object may include a new flag bit that denotes and/or indicates that label 605 is a "pop and forward" label, as opposed to a "swap and forward label," such that the ingress node is able to determine the correct label type of each hop in the LSP. Network node 510 may then forward the reservation message to network node 202.

In this example, network node 202 may assign label 505 to the link that leads to network node 510. Upon receiving the reservation message, network node 202 may add label 505 to the reservation message. In some examples, network node 202 may also add its IP address to the reservation message. Network node 202 may then forward the reservation message to network node 206.

In this example, network node 206 may assign label 105 to the link that leads to network node 202. Upon receiving the reservation message, network node 206 may add label 105 to the reservation message. In some examples, network node 206 may also add its IP address to the reservation message. Network node 206 may then forward the reservation message to network node 502.

Figure 4:
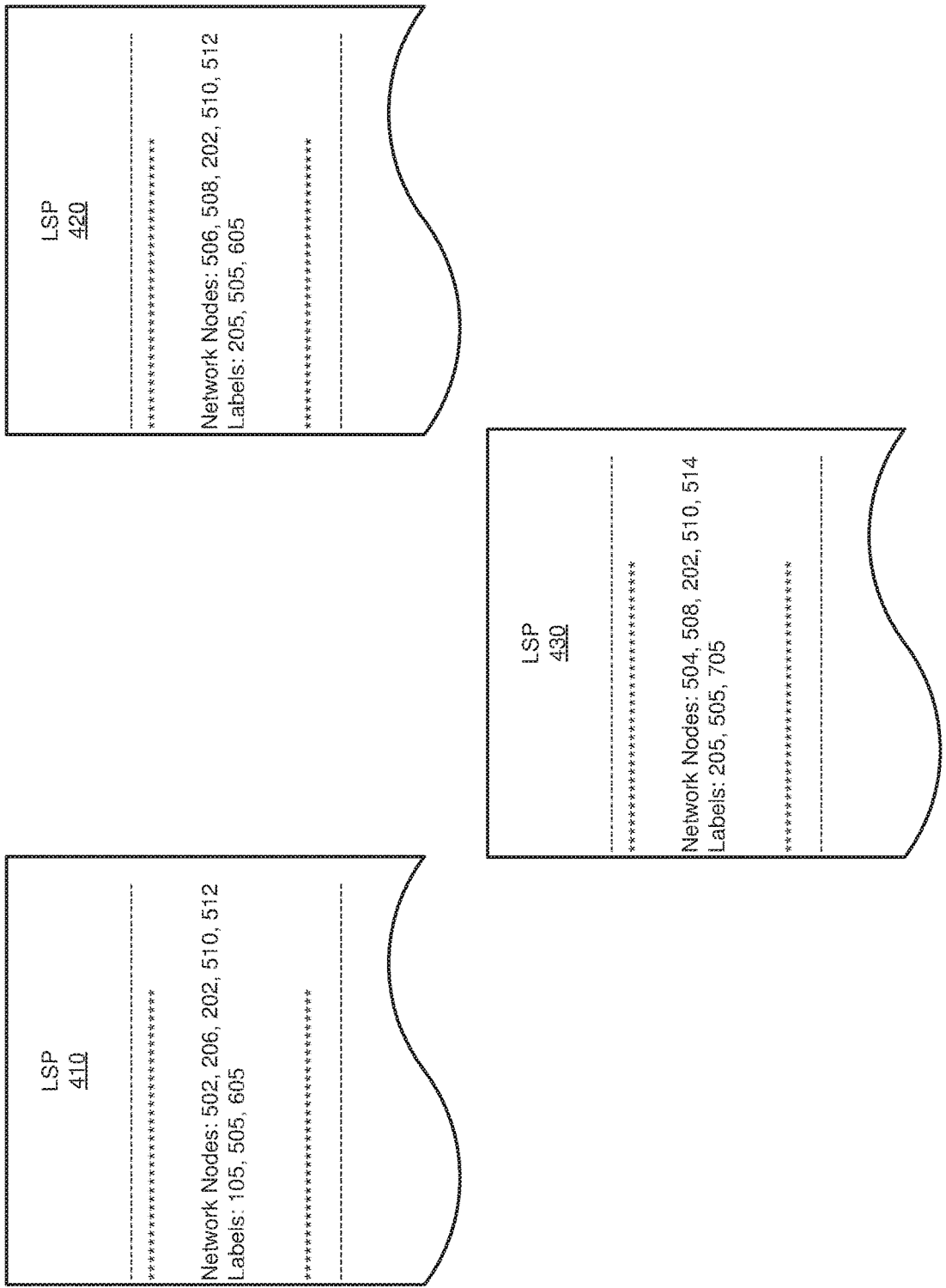
FIG. 4 is an illustration of information that identifies LSPs.

Upon receiving the reservation message, network node 502 may compute the LSP identified in the reservation message and then establish the LSP by recording all of the labels included in the reservation message. For example, network node 502 may parse the record-route object in the reservation message to create LSP 410 in FIG. 4 based at least in part on labels 105, 505, and 605. However, in the event that all nodes included in the LSP support "pop and forward" labels, network node 502 may simply stack the labels recorded in the record-route object of the reservation message. As illustrated in FIG. 4, LSP 410 may include and/or represent network nodes 502, 206, 202, 510, and 512 and labels 105, 505, and 605 that lead from node 206 to node 202, from node 202 to node 510, and from node 510 to node 512, respectively.

Now that LSP 410 has been established, network node 502 may forward packets along LSP 410 to network node 512 by inserting a label stack consisting of labels 105, 505, and 605 in the packets' headers. In addition, network node 502 may manage and/or modify LSP 410 at a later point in time.

In some examples, network node 504 in FIG. 5 may create and/or establish an LSP 420 that includes network nodes 504, 508, 202, 510, and 512 in the same way as LSP 410. As illustrated in FIG. 4, LSP 420 may include and/or represent network nodes 504, 508, 202, 510, and 512 and labels 205, 505, and 605 that lead from node 508 to node 202, from node 202 to node 510, and from node 510 to node 512, respectively.

Additionally or alternatively, network node 506 in FIG. 5 may create and/or establish an LSP 430 that includes network nodes 506, 508, 202, 510, and 514 in the same way as LSP 410. As illustrated in FIG. 4, LSP 430 may include and/or represent network nodes 506, 508, 202, 510, and 514 and labels 205, 505, and 705 that lead from node 508 to node 202, from node 202 to node 510, and from node 510 to node 514, respectively.

As demonstrated by LSPs 410, 420, and 430, the various apparatuses and/or systems described herein may share labels across LSPs. For example, LSPs 410, 420, and 430 may each include and/or utilize label 505. Similarly, LSPs 410 and 420 may each include and/or utilize label 605. In addition, LSPs 420 and 430 may each include and/or utilize label 205. Accordingly, label module 108 may enable different LSPs to use the same label for a specific link instead of assigning distinct labels to the same link across the different LSPs, thereby drastically reducing resource consumption and/or processing demands. As a result, each network node may be able to manage the labels in the forwarding table of the data plane without needing to perform updates so frequently when compared to traditional label-management configurations.

In this example, network node 202 may represent the ingress of LSP 410, and network node 512 may represent the egress of LSP 410. Upon establishing LSP 410, network node 502 may identify a packet that is at least intermediately destined for network node 512. In one example, the packet may have a final destination of a client device (not illustrated in FIG. 2 or 5) that is reachable via network node 512. Alternatively, the packet may have a final destination of network node 512 itself.

In one example, network node 502 may determine that LSP 410 leads to network node 512. In response to that determination, network node 502 may formulate and/or generate a label stack consisting of labels 105, 505, and 605 for the packet. Network node 502 may add this label stack to the packet to facilitate traversing from network node 502 to network node 512 via LSP 410. Network node 502 may then forward the packet to network node 206 on the way to network node 512 via LSP 410.

Returning to FIG. 3, at step 330 one or more of the apparatuses and/or systems described herein may pop, from the label stack, a label that corresponds to a specific link to a further network node. For example, label module 108 may, as part of network node 202 in FIG. 2 or 5, pop a label from the label stack included in the packet's header. In this example, the popped label may correspond to the link and/or interface that leads from network device 202 to network node 510 in FIG. 5.

The systems described herein may perform step 330 in a variety of different ways and/or contexts. In some examples, label module 108 may identify the next label to be popped from the label stack included in the packet's header. Upon identifying that label, label module 108 may pop that label from the label stack. For example, label module 108 may delete and/or remove label 505 from the label stack. In this example, label 505 may identify the link leading to network node 510 as the next portion of the LSP to be traversed by the packet. The label stack may still include label 605, which directs the packet to the LSP's egress at network node 512.

Returning to FIG. 3, at step 340 one or more of the apparatuses and/or systems described herein may forward the packet to the further network node by way of the specific link. For example, forwarding module 110 may, as part of network node 202 in FIG. 2 or 5, forward the packet to network node 510 by way of the link identified by label 505. In this example, the packet may traverse to network node 510 on the way to network node 512.

The systems described herein may perform step 340 in a variety of different ways and/or contexts. In some examples, forwarding module 110 may direct network node 202 to send the packet to network node 510 via the link identified by label 505. In such examples, forwarding module 110 may forward the packet to network node 510 without applying any new labels to replace popped label 505 since the remaining link is already identified by label 605 included in the label stack.

Accordingly, this MPLS label-management scheme may effectively represent a "pop and forward" technique instead of a "swap and forward" technique. In other words, the network nodes may no longer need to switch and/or swap labels before forwarding packets. Instead, these network nodes may simply pop the corresponding label from the label stack and then forward the packets.

In some examples, network node 510 may receive the packet from network node 202. Upon receiving the packet, network node 510 may pop label 605 from the label stack. In this example, label 605 may correspond to and/or identify the link that leads to network node 512. Network node 510 may then forward the packet to network node 512 by way of that link.

In some examples, certain LSPs may include a combination of "pop and forward" labels and "swap and forward" labels. In this context, the term "pop and forward" label generally refers to a label that is simply removed from a label stack at an intermediary node of an LSP without being replaced by any new label. In contrast, the term "swap and forward" label generally refers to a label that is swapped for another label at an intermediary node of an LSP. Traditional MPLS label-management schemes may be unable and/or fail to assign or utilize "pop and forward" labels.

Figure 7:
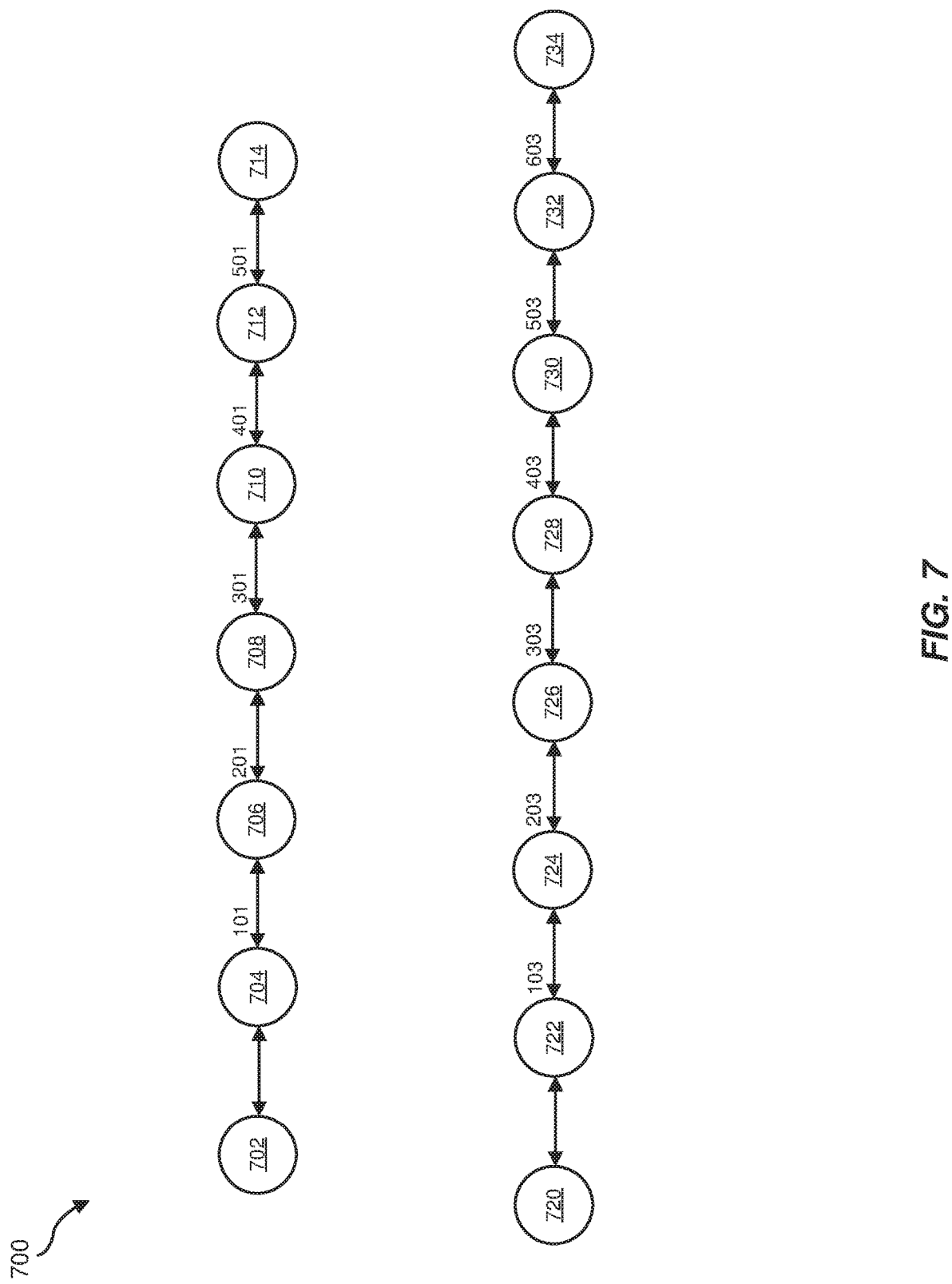
FIG. 7 is a block diagram of an additional exemplary system for sharing labels across LSPs within networks.

As a specific example, LSP 610 in FIG. 6 may include network nodes 702, 704, 706, 708, 710, 712, and 714 in FIG. 7. In this example, network nodes 704 and 706 may be configured and/or programmed to assign and/or utilize "pop and forward" labels. However, network nodes 708, 710, and 712 may be configured and/or programmed to assign and/or utilize "swap and forward" labels. Accordingly, labels 101 and 201 in FIG. 7 may represent "pop and forward" labels, and labels 301, 401, and 501 in FIG. 7 may represent "swap and forward" labels.

In some examples, network nodes 708, 710, and 712 may assign labels 301, 401, and 501 to their respective links during RSVP signaling. In one example, the ingress node (e.g., network node 702) may select which type of label (whether "pop and forward" or "swap and forward") to utilize at certain hops. Alternatively, a controller (not necessarily illustrated in FIG. 7) may select which type of label to utilize at certain hops. In this example, the controller may notify the ingress node of those label selections for the corresponding intermediary nodes.

In some examples, the intermediary network nodes may select either a "pop and forward" label or a "swap and forward" label for outbound packets. For example, network node 710 may select a "pop and forward" label for its link in an LSP. However, network node 708 may select a "swap and forward" label for its link in the LSP. As a result, network node 708 may swap into the "pop and forward" label selected by network node 710, and thus network node 702 may omit and/or exclude the "pop and forward" label selected by network node 710 from the label stack because network node 702 is aware that network node 708 is configured and/or programmed to swap into that "pop and forward" label.

In one example, network node 702 may identify a packet that is at least intermediately destined for network node 714. In this example, network node 702 may determine that LSP 610 leads to network node 714. In response to that determination, network node 702 may formulate and/or generate a label stack consisting of labels 101, 201, and 301, which correspond to the links from node 704 to node 706, from node 706 to node 708, and from node 708 to node 710, respectively. However, the label stack may omit and/or exclude labels 401 and 501.

Continuing with this example, network node 702 may add this label stack to the packet to facilitate traversing from network node 702 to network node 714 via LSP 610. Network node 702 may then forward the packet to network node 704 on the way to network node 714 via LSP 610. In this example, network nodes 704 and 706 may each pop their corresponding label from the label stack and then forward the packet. However, network nodes 708, 710, and 712 may each swap an existing label in the packet for a new label that identifies the correct link at the next hop.

As another example, LSP 620 in FIG. 6 may include network nodes 720, 722, 724, 726, 728, 730, 732, and 734 in FIG. 7. In this example, network nodes 722, 730, and 732 may be configured and/or programmed to assign and/or utilize "pop and forward" labels. However, network nodes 724, 726, and 728 may be configured and/or programmed to assign and/or utilize "swap and forward" labels. Accordingly, labels 103, 503, and 603 in FIG. 7 may represent "pop and forward" labels, and labels 203, 303, and 403 in FIG. 7 may represent "swap and forward" labels.

In one example, network node 720 may identify a packet that is at least intermediately destined for network node 734. In this example, network node 720 may determine that LSP 620 leads to network node 734. In response to that determination, network node 720 may formulate and/or generate a label stack consisting of labels 103, 203, and 603, which correspond to the links from node 722 to node 724, from node 724 to node 726, and from node 732 to node 734, respectively. However, the label stack may omit and/or exclude labels 303, 403, and 503.

Continuing with this example, network node 720 may add this label stack to the packet to facilitate traversing from network node 720 to network node 734 via LSP 620. Network node 720 may then forward the packet to network node 722 on the way to network node 734 via LSP 620. In this example, network nodes 722, 730, and 732 may each pop their corresponding label from the label stack and then forward the packet. However, network nodes 724, 726, and 728 may each swap an existing label in the packet for a new label that identifies the correct link at the next hop.

In some examples, the ingress node may request that one of the intermediate nodes in the LSP push a separate label stack onto certain packets. For example, network node 720 may request that network node 728 add, to a packet, a label stack that includes labels 503 and 603 to facilitate traversing to network node 734. In this example, network node 720 may add a label stack that includes labels 103, 203, 303, and 403 to a packet and then forward the same to network node 722. Labels 103, 203, 303, and 403 may enable nodes 722, 724, 726, and 728, respectively, to direct the packet to network node 730. Upon receiving the packet, network node 728 may swap label 403 for the new label stack that includes labels 503 and 603. Accordingly, label 403 may represent a "swap and forward" label. Network node 728 may then forward the packet to network node 730 on the way to network node 734.

Alternatively, an intermediate node in the LSP may elect to push a separate label stack onto certain packets regardless of whether the ingress node makes such a request. For example, network node 728 may elect to add a label stack that includes labels 503 and 603 to packets traversing from network node 720 to network node 734. However, network node 728 may need to notify network node 720 of this decision to add that label stack to such packets. To do so, network node 728 may modify the reservation message destined for network node 720 during the setup process to indicate that network node 728 is configured and/or programmed to add that label stack to such packets. Network node 720 may then formulate corresponding label stacks to include only labels 103, 203, 303, and 403 and exclude labels 503 and 603 because network node 728 will be responsible for pushing those labels at the appropriate time.

Figure 8:
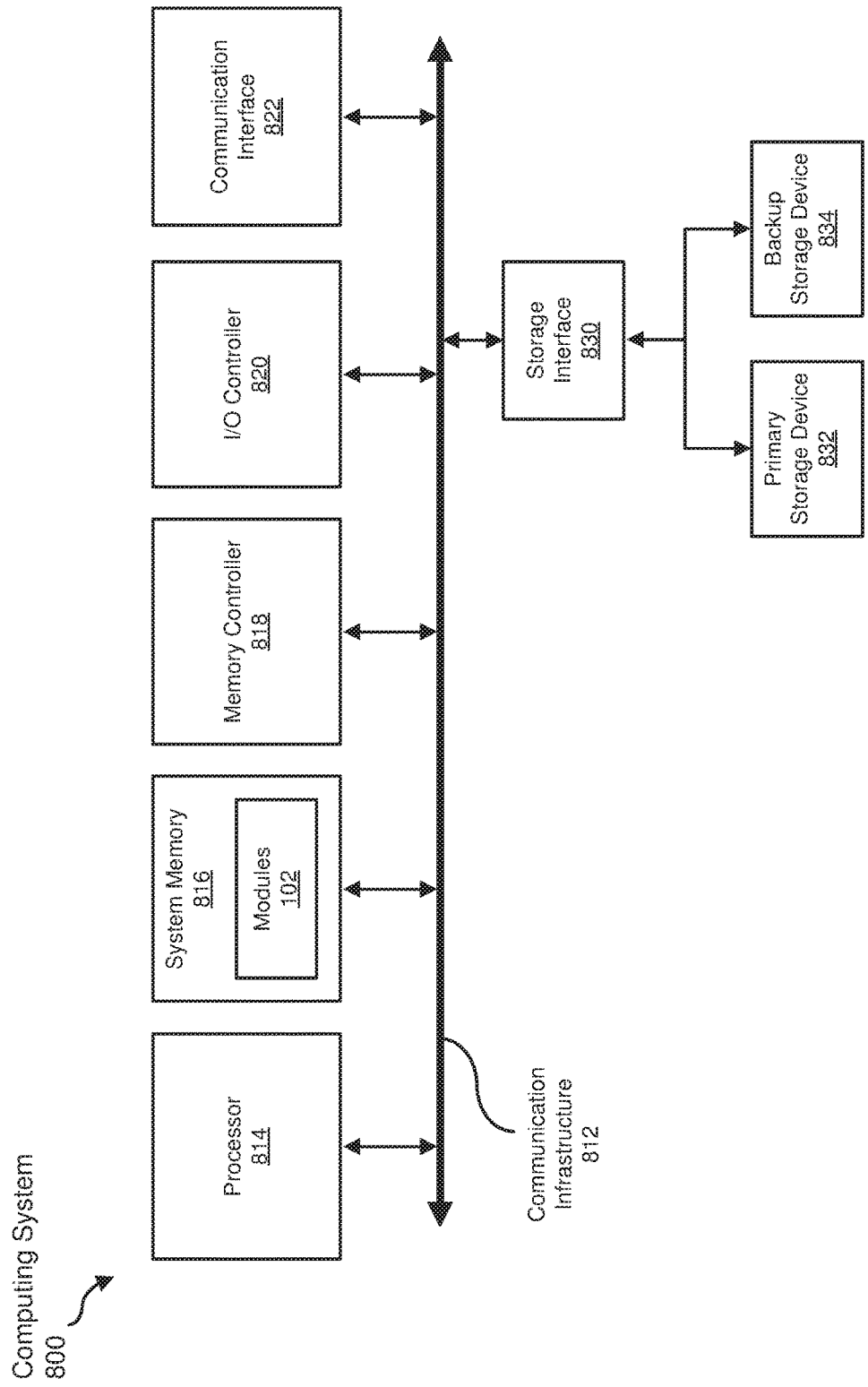
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein. In one example, computing system 800 may include and/or store all or a portion of modules 102 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   assigning, at a network node within a network, a label to a specific link between the network node and a further network node such that any packet whose label stack includes the label assigned to the specific link is forwarded to the further network node by way of the specific link;
   sharing the same label assigned to the specific link across a label-switched path and another label-switched path within the network instead of assigning different labels to the specific link for the label-switched path and the another label-switched path by:
      receiving, by the network node, a reservation message that is to include labels assigned to links that lead to network nodes included in the label-switched path within the network;
      adding, by the network node, the label assigned to the specific link to the reservation message;
      forwarding the reservation message toward an ingress node that manages the label-switched path to facilitate establishing the label-switched path within the network;
      receiving, by the network node, another reservation message that is to include labels assigned to links that lead to network nodes included in the another label-switched path within the network;
      adding, by the network node, the label assigned to the specific link to the another reservation message; and
      forwarding the another reservation message toward an ingress node that manages the another label-switched path to facilitate establishing the another label-switched path within the network.

2. The method of claim 1, further comprising:
   receiving, at the network node, a packet from another network node within the network;
   identifying, within the packet, a label stack that includes a plurality of labels that collectively represent at least a portion of a label-switched path within the network;
   popping, from the label stack, the label to the specific link between the network node and the further network node; and
   upon popping the label from the label stack, forwarding the packet to the further network node by way of the specific link.

3. The method of claim 2, wherein forwarding the packet to the further network node comprises forwarding the packet to the further network node without applying a new label to replace the popped label.

4. The method of claim 2, further comprising:
   receiving, at the ingress node, the reservation message that includes the labels assigned to the links that lead to the network nodes included in the label-switched path; and
   establishing, by the ingress node, the label-switched path based at least in part on the labels included in the reservation message.

5. The method of claim 4, further comprising:
   identifying, at the ingress node, the packet as being at least intermediately destined for an egress node;
   determining that the label-switched path leads to the egress node;
   formulating, by the ingress node, the label stack for the packet to include the labels that collectively represent the portion of the label-switched path within the network; and
   adding, by the ingress node, the label stack to the packet to facilitate traversing from the ingress node to the egress node via the label-switched path.

6. The method of claim 1, further comprising:
   receiving, at the further network node, the packet from the network node;
   popping, from the label stack, an additional label that corresponds to an additional link to an additional network node; and
   upon popping the additional label from the label stack, forwarding the packet to the additional network node by way of the additional link.

7. The method of claim 1, further comprising:
   receiving, at the further network node, the packet from the network node;
   swapping an additional label that corresponds to an additional link to an additional network node with a further label by:
      popping the additional label from the label stack within the packet; and
      applying the further label to the packet; and
   upon swapping the additional label with the further label, forwarding the packet to the additional network node by way of the additional link.

8. A system comprising:
   a label module, stored in memory at a network node, that:
      assigns a label to a specific link between the network node and a further network node such that any packet whose label stack includes the label assigned to the specific link is forwarded to the further network node by way of the specific link; and shares the same label assigned to the specific link across a label-switched path and another label-switched path within the network instead of assigning different labels to the specific link for the label-switched path and the another label-switched path;

a receiving module, stored in memory at the network node, that:

receives a reservation message that is to include labels assigned to links that lead to network nodes included in the label-switched path within the network; and receives another reservation message that is to include labels assigned to links that lead to network nodes included in the another label-switched path within the network;

wherein the label module:

adds the label assigned to the specific link to the reservation message; and adds the label assigned to the specific link to the another reservation message;

a forwarding module, stored in memory at the network node, that:

forwards the reservation message toward an ingress node that manages the label-switched path; and forwards the another reservation message toward an ingress node that manages the another label-switched path; and at least one physical processor configured to execute the label module, the receiving module, and the forwarding module.

9. The system of claim 8, wherein the receiving module receives a packet from another network node within the network;

further comprising an identification module, stored in memory at the network node, that identifies, within the packet, a label stack that includes a plurality of labels that collectively represent at least a portion of a label-switched path within the network; and wherein:

the label module pops, from the label stack, a label that corresponds to a specific link to a further network node; and the forwarding module forwards the packet to the further network node by way of the specific link.

10. The system of claim 9, wherein the forwarding module forwards the packet to the further network node without applying a new label to replace the popped label.

11. The system of claim 9, further comprising:

another receiving module, stored in memory at the ingress node, that receives the reservation message that includes the labels assigned to the links that lead to the network nodes included in the label-switched path; and a path module, stored in memory at the ingress node, that establishes the label-switched path based at least in part on the labels included in the reservation message.

12. The system of claim 11, further comprising:

another identification module, stored in memory at the ingress node, that:

identifies the packet as being at least intermediately destined for an egress node; and determines that the label-switched path leads to the egress node;

another label module, stored in memory at the ingress node, that:

formulates the label stack for the packet to include the labels that collectively represent the portion of the label-switched path within the network; and adds the label stack to the packet to facilitate traversing from the ingress node to the egress node via the label-switched path.

13. The system of claim 8, further comprising:

another receiving module, stored in memory at the further network node, that receives, at the further network node, the packet from the network node;

another label module, stored in memory at the further network node, that pops, from the label stack, an additional label that corresponds to an additional link to an additional network node; and another forwarding module, stored in memory at the further network node, that forwards the packet to the additional network node by way of the additional link.

14. The system of claim 8, further comprising:

another receiving module, stored in memory at the further network node, that receives the packet from the network node;

another label module, stored in memory at the further network node, that swaps an additional label that corresponds to an additional link to an additional network node with a further label by:

popping the additional label from the label stack within the packet; and applying the further label to the packet; and another forwarding module, stored in memory at the further network node, that forwards the packet to the additional network node by way of the additional link.

15. An apparatus comprising:

at least one storage device that stores a plurality of labels that correspond to portions of label-switched paths within a network; and at least one physical processing device communicatively coupled to the storage device within a network node, wherein the physical processing device:

assigns a label to a specific link between the network node and a further network node such that any packet whose label stack includes the label assigned to the specific link is forwarded to the further network node by way of the specific link; and shares the same label assigned to the specific link across a label-switched path and another label-switched path within the network instead of assigning different labels to the specific link for the label-switched path and the another label-switched path by:

receiving a reservation message that is to include labels assigned to links that lead to network nodes included in the label-switched path within the network;

adding the label assigned to the specific link to the reservation message;

forwarding the reservation message toward an ingress node that manages the label-switched path;

receiving another reservation message that is to include labels assigned to links that lead to network nodes included in the another label-switched path within the network;

adding the label assigned to the specific link to the another reservation message; and forwarding the another reservation message toward an ingress node that manages the another label-switched path.

16. The apparatus of claim 15, wherein the physical processing device:
- receives a packet from another network node within the network;
- identifies, within the packet, a label stack that includes a plurality of labels that collectively represent at least a portion of a label-switched path within the network;
- pops, from the label stack, the label to the specific link between the network node and the further network node; and
- upon popping the label from the label stack, forwards the packet to the further network node by way of the specific link.

17. The apparatus of claim 16, wherein the physical processing device forwards the packet to the further network node without applying a new label to replace the popped label.

* * * * *